United States Patent [19]
Huang

[11] Patent Number: 5,722,173
[45] Date of Patent: Mar. 3, 1998

[54] SAW BLADE ADJUSTING MECHANISM

[76] Inventor: Yin Han Huang, P.O. Box 63-99, Taichung, Taiwan

[21] Appl. No.: 767,418

[22] Filed: Dec. 16, 1996

[51] Int. Cl.⁶ .......................... B27B 21/02; B27B 21/06
[52] U.S. Cl. ........................ 30/510; 30/513; 30/519
[58] Field of Search ........................ 30/507, 510, 511, 30/513, 517, 519

[56] References Cited

U.S. PATENT DOCUMENTS

| | | | |
|---|---|---|---|
| 2,048,627 | 7/1936 | Schmidt et al. | 30/513 X |
| 5,471,752 | 12/1995 | Koetsch | 30/513 |

*Primary Examiner*—Douglas D. Watts

[57] ABSTRACT

A saw includes a handle having a channel formed in the upper portion for slidably receiving a beam. An arm is secured to one end of the beam. Two rotary members are pivotally secured to the handle and the arm for supporting a saw blade. A knob is slidably engaged in the handle and has a key for engaging with one of the rotary member and for securing the rotary member to the handle. The arm includes a stop for engaging with and for positioning the other rotary member to the arm. The beam and the arm are moved away from the handle for stretching and for securing the saw blade in place.

4 Claims, 4 Drawing Sheets

SAW BLADE ADJUSTING MECHANISM

BACKGROUND OF THE INVENTION

1. Field of the Invention

The present invention relates to a saw blade, and more particularly to a saw blade adjusting mechanism.

2. Description of the Prior Art

Typical saws comprise a saw blade solidly secured to a handle for conducting sawing operation. The saw blade may not be adjusted to different angles. U.S. Pat. No. 5,271,158 to Chen discloses a saw blade adjusting device for adjusting the saw blade to different angles. However, only one end of the saw blade may be retained in place. In addition, the saw blade may be pulled to be broken by the screw.

The present invention has arisen to mitigate and/or obviate the afore-described disadvantages of the conventional saws.

SUMMARY OF THE INVENTION

The primary objective of the present invention is to provide a saw blade that may be adjusted to different angles and may be solidly retained in place.

In accordance with one aspect of the invention, there is provided a saw comprising a handle including an upper portion and a bottom portion, a channel formed in the upper portion of the handle, a beam including a first end slidably engaged in the channel of the handle and including a second end, a first rotary member pivotally secured to the bottom portion of the handle, an arm secured to the second end of the beam, the arm including a bottom portion, a second rotary member pivotally secured to the bottom portion of the arm, a saw blade secured to the first rotary member and the second rotary member and rotated in concert with the first and the second rotary members, means for securing the first rotary member to the handle, means for positioning the second rotary member to the arm, and means for moving the beam and the arm away from the handle for separating the second rotary member from the first rotary member and for retaining the saw blade in place.

The first and the second rotary members each includes at least one projection for engaging with and for attaching the saw blade to the handle and the arm.

The first rotary member includes a plurality of cavities, the handle includes a hole formed in the bottom portion of the handle, the securing means includes a knob slidably engaged in the hole of the handle and having a key for engaging with the cavities, and means for biasing the key to engage with the cavities and to secure the first rotary member to the handle.

The second rotary member includes a plurality of notches, the positioning means includes a stop secured in the bottom portion of the arm for engaging with the notches of the rotary member and for positioning the second rotary member to the arm.

The moving means includes an inclined bolt extended upward from the upper portion of the handle, a slide slidably engaged on the inclined bolt and having a protrusion engaged with the first end of the beam, and means for moving the slide along the inclined bolt for moving the beam and the arm away from the handle.

Further objectives and advantages of the present invention will become apparent from a careful reading of a detailed description provided hereinbelow, with appropriate reference to accompanying drawings.

DETAILED DESCRIPTION OF THE PREFERRED EMBODIMENT

Figure 1:
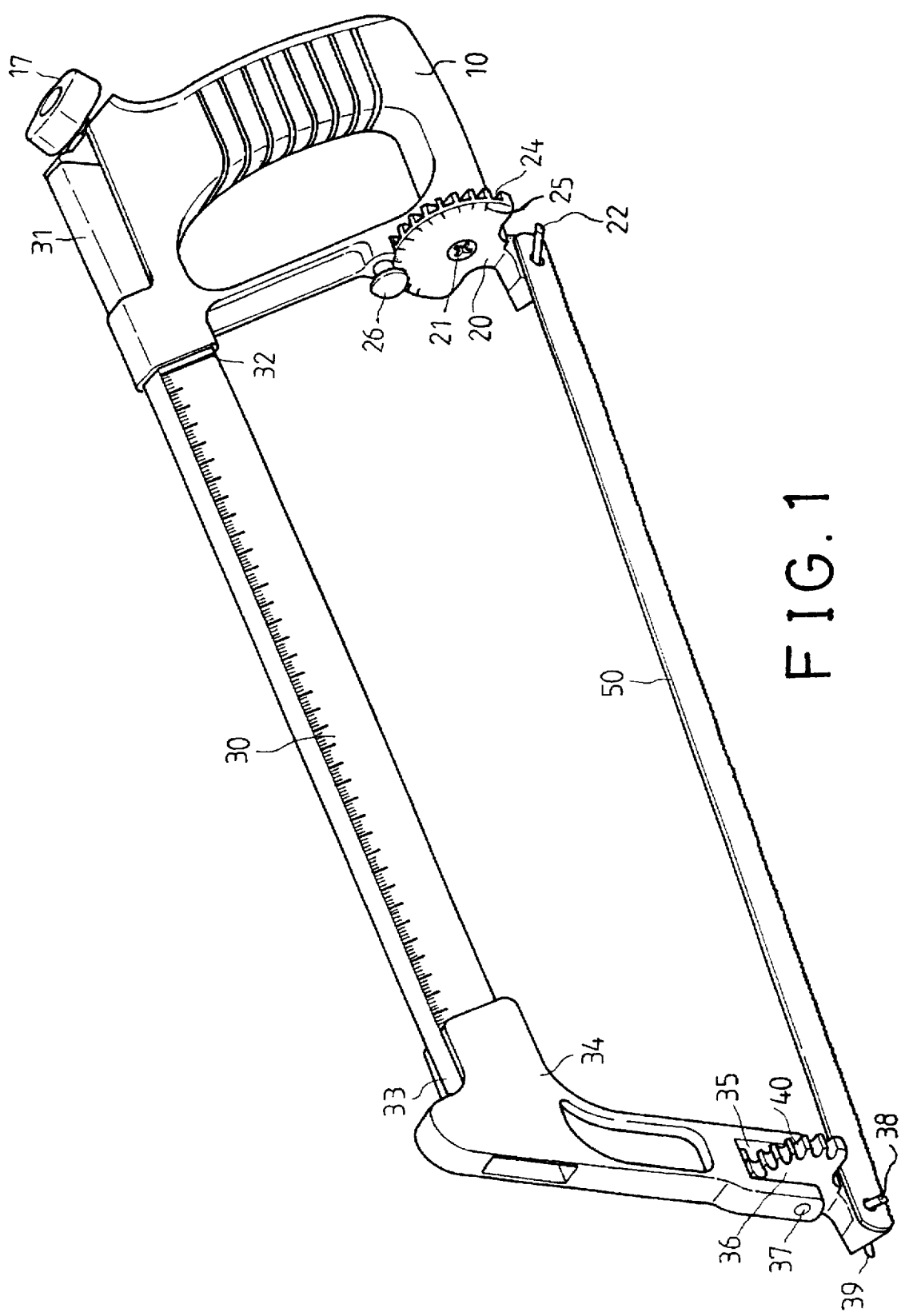
FIG. 1 is a perspective view of a saw in accordance with the present invention.
Figure 2:
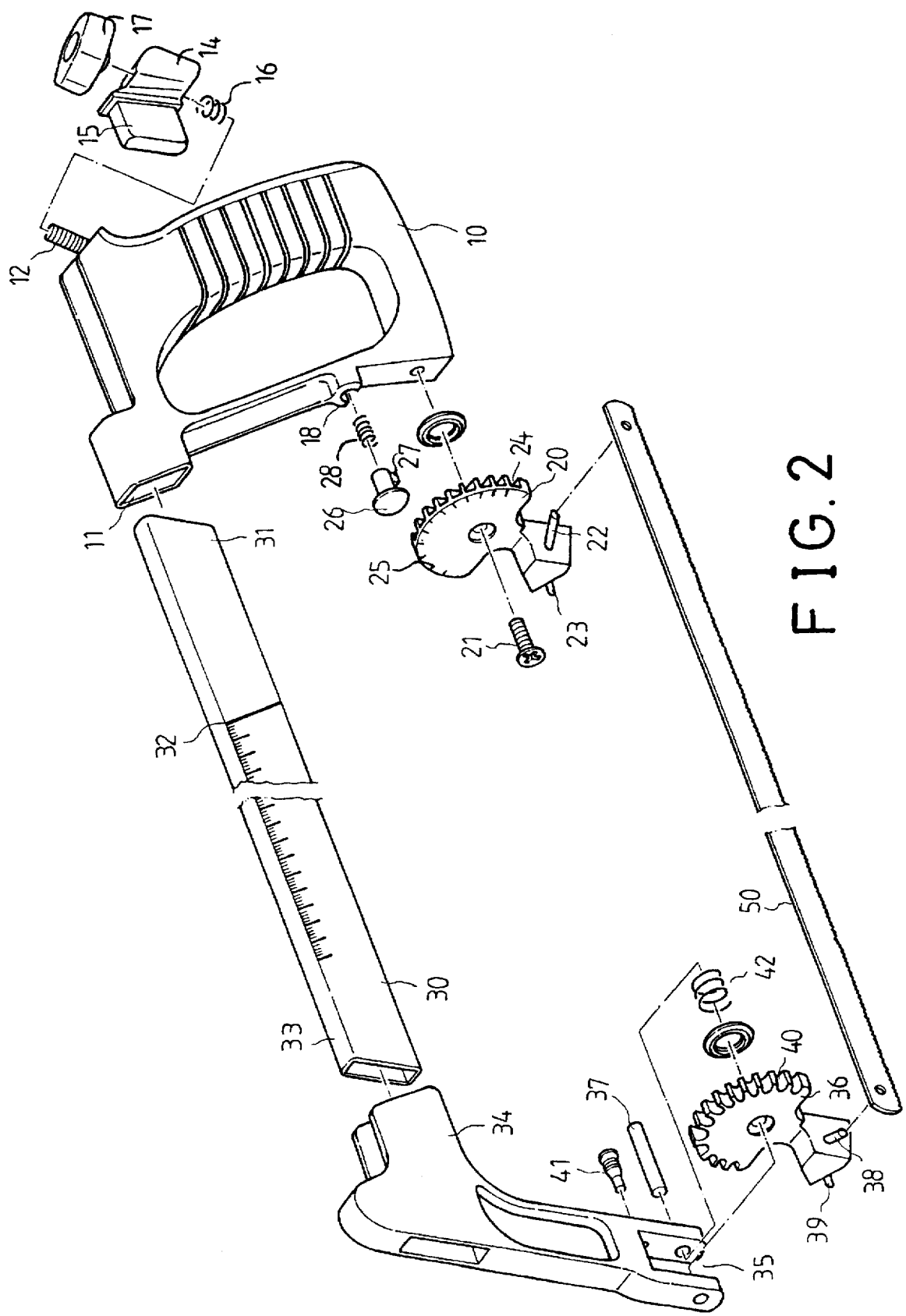
FIG. 2 is an exploded view of the saw.
Figure 3:
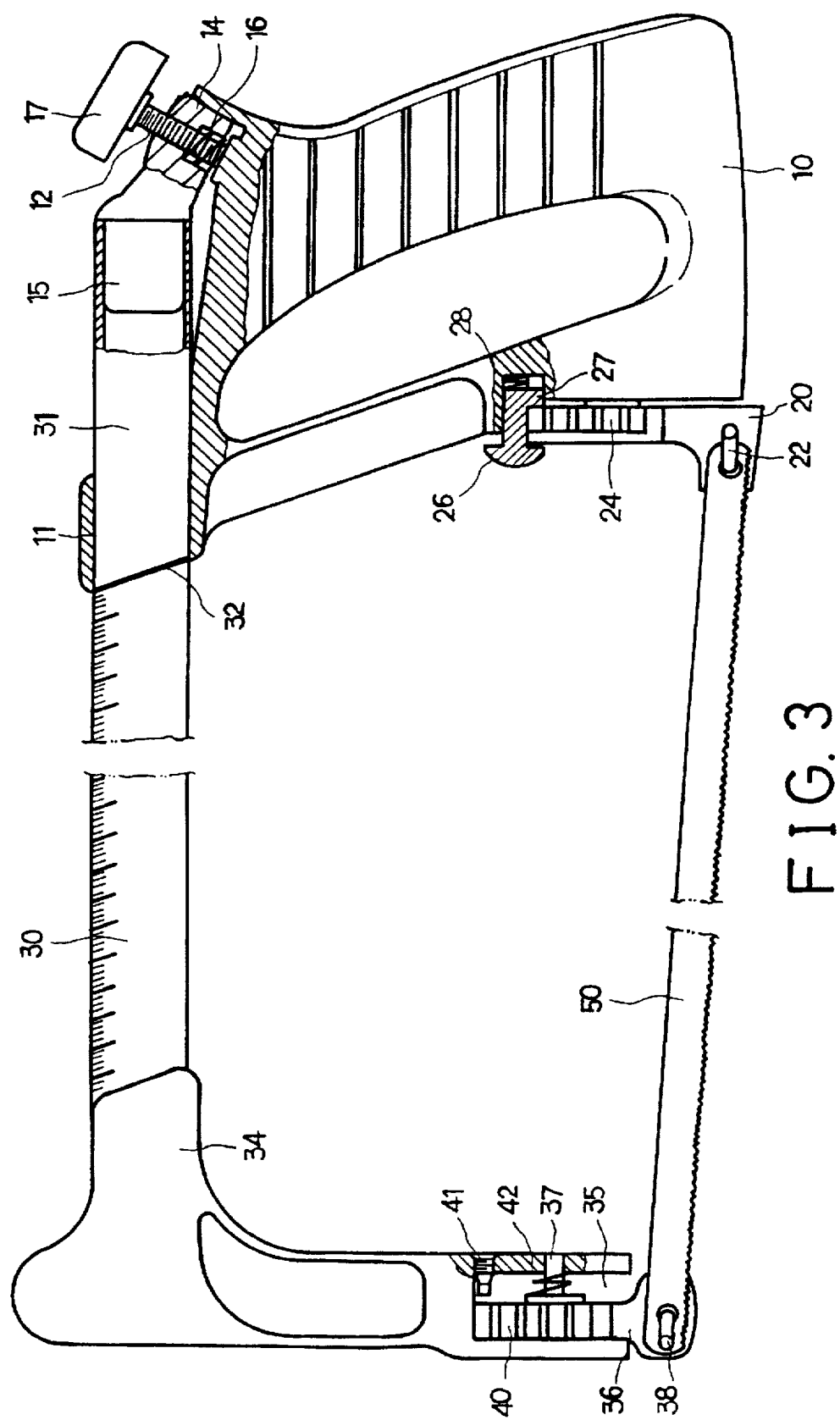
FIGS. 3 and 4 are partial cross sectional views illustrating the operation of the saw.

Referring to the drawings, and initially to FIGS. 1 to 3, a saw in accordance with the present invention comprises a handle 10 including a channel 11 formed in top for engaging with one end 31 of a beam 30 which includes the other end 33 secured to an upper end of an arm 34. The arm 34 and the beam 30 may be solidly secured together as a one piece member. The beam 30 includes an indicating line 32 for engaging with the handle 10 and for indicating the relative position between the handle 10 and the beam 30. An inclined bolt 12 is extended upward from the upper portion of the handle 10 for engaging with a nut 17. A slide 14 is slidably engaged on the bolt 12 and includes a protrusion 15 for engaging with the end 31 of the beam 30. The beam 30 and the slide 14 may both be moved slightly forward (FIG. 4) when the slide 14 is moved downward and forward by the nut 17.

A rotary member 20 is pivotally secured to the bottom portion of the handle 10 by a pivot pin or screw 21 and includes one or two projections 22, 23 for engaging with the end portion of the saw blade 50. The rotary member 20 includes a number of cavities 24 and includes a graduation 25 for indicating the rotational angle of the rotary member 20. The handle 10 includes a hole 18 for receiving a spring 28 and a knob 26. The knob 26 includes a key 27 biased to engage with either of the cavities 24 of the rotary member 20 by the spring 28 such that the rotary member 20 may be secured to the handle 10 at a selected angular position.

The arm 34 includes a space 35 formed in the bottom for rotatably receiving another rotary member 36 at a pivot pin 37. The rotary member 36 also includes two projections 38, 39 for engaging with the other end of the saw blade 50. The rotary member 36 includes a number of notches 40 for engaging with a stop 41 which is secured to the arm 34. A spring 42 is engaged on the pin 37 and engaged with the rotary member 36 for disengaging the rotary member 36 from the stop 41.

Figure 4:
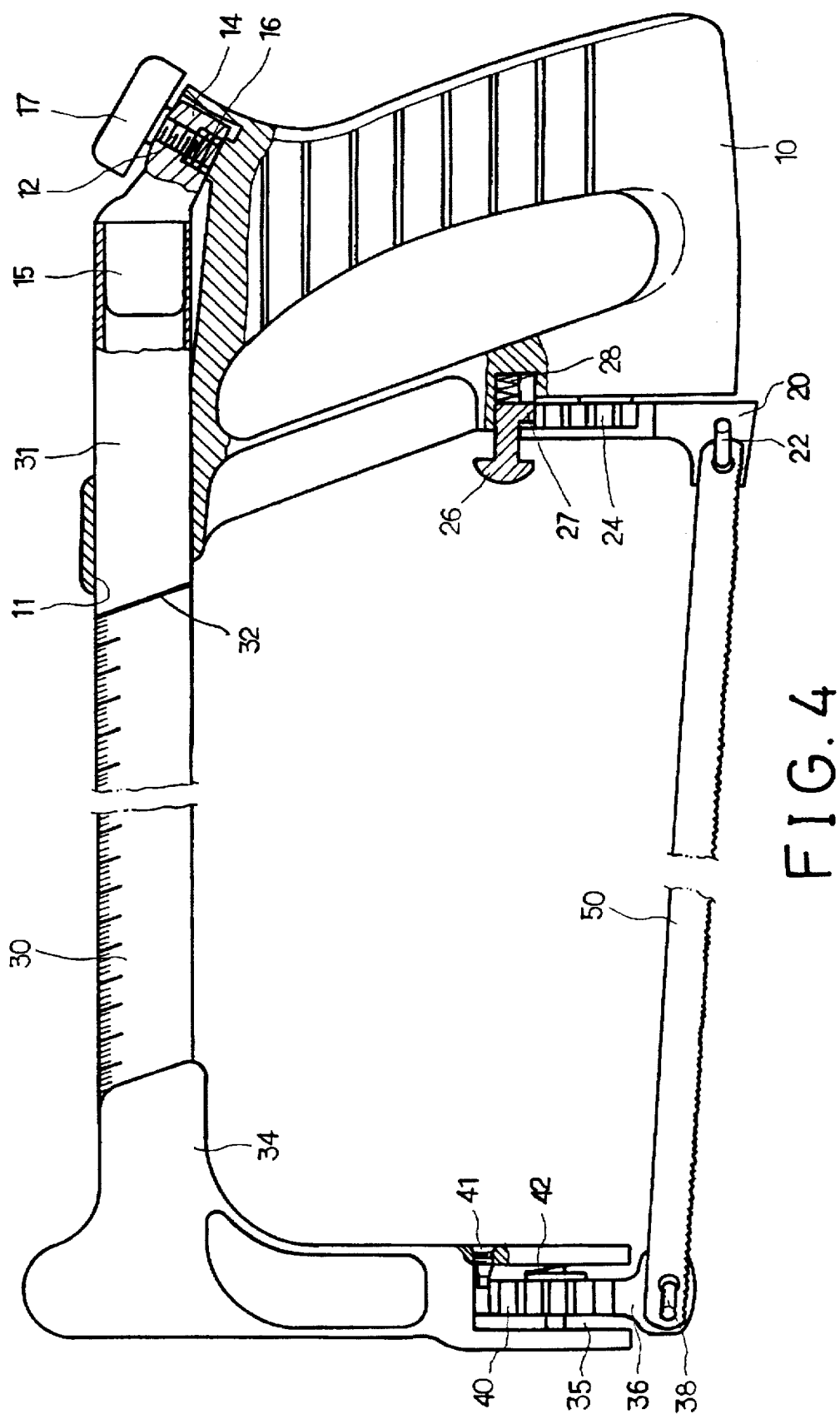

In operation, as shown in FIG. 3, the one end 31 of the beam 30 is engaged into the channel 11 of the handle 10 for aligning and for engaging the indicating line 32 with the handle 10 when the slide 14 has not be moved downward and forward along the bolt 12 by the nut 17. The rotary member 36 is disengaged from the stop 41 by the spring 42 such that the rotary member 36 may be rotated freely about the pin 37. When the knob 26 is depressed against the spring 28 for disengaging the key 27 from the rotary member 20, the rotary member 20 may also be rotated to adjusting the saw blade 50 to suitable angular position. The rotary member 20 may be secured in place when the knob 26 is released and when the key 27 is engaged with either of the cavities 24 of the rotary member 20 again (FIG. 4). In addition, when slide 14 is moved downward and forward along the bolt 12 by the nut 17, the beam 30 and the arm 34 may be moved forward such that the rotary member 36 may be pulled rearward against the spring 42 and such that the stop 41 may engage with either of the notches 40 of the rotary member 36 so as to secure the rotary member 36 to the arm 34. The indicating line 32 will move forward relative to the handle 10 for indicating the relative position between the handle 10 and the beam 30.

It is to be noted that the beam 30 may be moved forward for only a short distance, preferably about 2 mm, which is determined by the inclined angle of the bolt 12, such that the saw blade 50 will not be over-stretched.

Accordingly, the saw in accordance with the present invention includes a saw blade that may be adjusted to different angles and may be solidly retained in place.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A saw comprising:

a handle including an upper portion and a bottom portion, a channel formed in said upper portion of said handle, a beam including a first end slidably engaged in said channel of said handle and including a second end, a first rotary member pivotally secured to said bottom portion of said handle, an arm secured to said second end of said beam, said arm including a bottom portion, a second rotary member pivotally secured to said bottom portion of said arm, a saw blade secured to said first rotary member and said second rotary member and rotated in concert with said first and said second rotary members, means for securing said first rotary member to said handle, means for positioning said second rotary member to said arm, and means for moving said beam and said arm away from said handle for separating said second rotary member from said first rotary member and for retaining said saw blade in place, said moving means including an inclined bolt extended upward from said upper portion of said handle, a slide slidably engaged on said inclined bolt and having a protrusion engaged with said first end of said beam, and means for moving said slide along said inclined bolt and for moving said beam and said arm away from said handle.

2. A saw according to claim 1, wherein said first and said second rotary members each includes at least one projection for engaging with and for attaching said saw blade to said handle and said arm.

3. A saw according to claim 1, wherein said first rotary member includes a plurality of cavities, said handle includes a hole formed in said bottom portion of said handle, said securing means includes a knob slidably engaged in said hole of said handle and having a key for engaging with said cavities, and means for biasing said key to engage with said cavities and to secure said first rotary member to said handle.

4. A saw according to claim 1, wherein said second rotary member includes a plurality of notches, said positioning means includes a stop secured in said bottom portion of said arm for engaging with said notches of said rotary member and for positioning said second rotary member to said arm.

* * * * *